United States Patent
Zhang et al.

(10) Patent No.: US 6,423,772 B1
(45) Date of Patent: Jul. 23, 2002

(54) ORGANO-BRIDGED LADDERLIKE POLYSILOXANE, TUBE-LIKE ORGANOSILICON POLYMERS, COMPLEXES THEREOF, AND THE METHOD FOR PRODUCING THE SAME

(75) Inventors: Rongben Zhang; Chunqing Liu; Ping Xie; Huadong Tang, all of Beijing (CN)

(73) Assignee: Institute of Chemistry, Chinese Academy of Sciences, Beijing ( * ) Notice: Subject to any disclaimer, the term of this patent is extended or adjusted under 35 U.S.C. 154(b) by 0 days.

(21) Appl. No.: 09/616,338

(22) Filed: Jul. 14, 2000

(30) Foreign Application Priority Data

Jul. 16, 1999 (CN) .......................... 99109826 A
Aug. 16, 1999 (CN) .......................... 99111452 A
Aug. 16, 1999 (CN) .......................... 99111453 A

(51) Int. Cl.$^7$ ...................... L08L 83/14; L08G 77/52
(52) U.S. Cl. ................ 524/588; 524/237; 524/266; 524/284; 524/356; 524/379; 524/424; 524/427; 524/434; 524/435; 524/439; 524/440; 524/714; 524/765; 524/773; 524/796; 524/779; 524/860; 528/15; 528/25; 528/34; 528/35; 528/43; 525/474; 525/475; 525/477; 525/478; 525/479
(58) Field of Search .................. 528/15, 25, 34, 528/35, 43; 525/474, 475, 477, 478, 479; 524/237, 266, 284, 356, 379, 424, 427, 434, 435, 439, 440, 588, 714, 779, 860, 765, 773, 776

(56) References Cited

U.S. PATENT DOCUMENTS 4,670,299 A * 6/1987 Fukuyama et al. ........... 427/96
5,183,846 A * 2/1993 Aiba et al. .................. 524/865
5,484,687 A * 1/1996 Watanabe et al. ........... 430/296

FOREIGN PATENT DOCUMENTS

JP          55050645       *  4/1980
WO       WO 99/03910          1/1999
WO       WO 99/03911          1/1999

OTHER PUBLICATIONS

Polymers for advanced Technologies, vol. 8, pp. 657–661, Aug. 1997.
Derwent abstract of JP–55050645 Apr. 1980 Sudi et al.*

* cited by examiner

*Primary Examiner*—Robert Dawson
*Assistant Examiner*—Jeffrey B. Robertson
(74) *Attorney, Agent, or Firm*—Knobbe, Martens, Olson & Bear LLP

(57) ABSTRACT

The present invention provides to an organo-bridged ladderlike polysiloxane having the following formula:

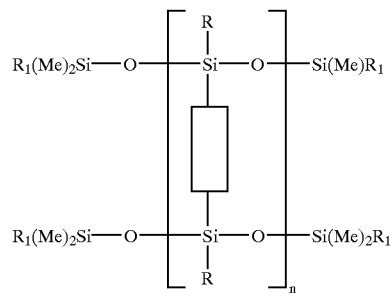

and a tube-like organosilicon polymer, complexes thereof and the method for producing the same.

11 Claims, No Drawings

ORGANO-BRIDGED LADDERLIKE POLYSILOXANE, TUBE-LIKE ORGANOSILICON POLYMERS, COMPLEXES THEREOF, AND THE METHOD FOR PRODUCING THE SAME

FIELD OF THE INVENTION

The present invention relates to an organosilicon material with ladderlike or tube-like structure and the method for producing the same, particularly the present invention relates to an organo-bridged ladderlike polysiloxane, tube-like organosilicon polymers, complexes thereof and the method for producing the same.

BACKGROUND ART

Polysiloxanes having a ladderlike structure have been widely used as the parts of electronic instruments, protection layer and interlayer insulation materials for semiconductors, pellicle materials, paint materials and the like, since they have excellent mechanical properties, and are excellent in heat resistance and electrical insulation.

Brown, J. F. (J. Am. Chem. Soc., 1960, 82, 6194) reported polyphenylsilsesquioxane with ladderlike structure. Japanese Patent No. 25061/1985(JP-B-60-25061), No. 36983/1989 (JP-B-1-36983) and No. 274056/1991(JP-A-3-274056) disclosed a photosensitive silicon resin composite comprising a ladderlike polysiloxane having an alkyl group, a phenyl group, a vinyl group, an allyl group and the like. Japanese Patent laid-open No.105881/1990 (JP-A-2-105991) disclosed a composite for forming a film comprising a hydroxy-terminated ladderlike polysiloxane having an alkyl group or a phenyl group and having a number-average molecular weight of 2000 to 5000.

However, it is difficult to obtain a high molecular weight polysiloxane with a ladderlike skeleton by using the methods described in the above publications. As is disclosed in the above applications, with the growing of the molecular weight of the ladderlike polysiloxane, the ladderlike skeleton in the polysiloxane tends to break and branch, resulting insolubility in organic solvents.

Especially, in the methods of above publications, trichlorosilanes having an alkyl group, an aralkyl group, or a phenyl group, which are unreactive or inert to hydrolysis (e.g., methyltricholorosilane and phenyltrichlorosilane) are used.

Chinese patent No. CN 94 1005071 disclosed highly regulated ladderlike hydrogen polysilsesquioxanes and copolymers and their preparation. In addition, there have been reported a highly regulated ladderlike reactive vinyl- or allyl-polysilsesquioxanes (React. Polym., 1999, 39, 1). Japanese Patent No. JP 08188649 disclosed highly regulated ladderlike polysilsesqioxanes and copolymers containing reactive groups and their preparation. They were synthesized via pre-coupling and stepwise hydrolysis, condensation by using organosilicon monomers containing reactive groups, such as trichlorosilane, vinyltrichlorosilane, allyltrichlorosilane, alkoxytrichlorosilane and the like as starting materials, and employing α,ω-diamine as the coupling reagent. They have the following structure.

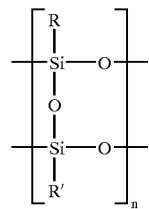

wherein R and R' can be the same or different, and are selected from the family consisting of hydrogen, alkyl, alkoxyl, aryl such as phenyl and biphenyl, and alkenyl such as vinyl, allyl.

As described in the above-mentioned Chinese patent No. CN 941005071 and Japanese patent No. JP 08188649, the highly regulated ladderlike polysilsesquioxanes prepared via precoupling with α,ω-diamine as coupling agent, hydrolysis and polycondensation have a high solubility and excellent film-forming ability, moreover, the gelification accompanied with growing molecular weight of the polymer as described in the earlier applications can be inhibited.

Especially, in the method described above, trichlorosilanes having reactive groups, such as hydrogen, vinyl and allyl, alkoxy groups etc can be used, because the reaction conditions are very mild. The resulted ladderlike polymers have reactive side chains, which can be used to produce different functional derivatives. The ladderlike polysiloxane possesses cis-isotactic configuration (Materials Science & Engineering, C 10, 1999, 13–18).

In the methods described in the above-mentioned Chinese patent No. CN 941005071 and Japanese patent No. JP 08188649, the first step is preamminolysis of trichlorosilane with α,ω)-diamine to obtain an intermediate represented by the following formula(II):

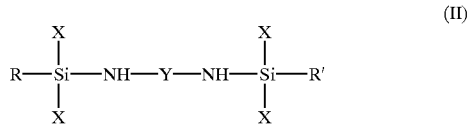

wherein X represents a halogen atom (Cl, Br, I), Y represents a diamine residue. R is hydrogen, alkyl, alkenyl, aryl or other substituting groups. During hydrolyis and polycondensation the bridged diamine residue is gradually removed. That means the diamine residue exists in the intermediate compound only plays a role of temporary bridge.

According to the method as mentioned above, highly regulated ladderlike polysiloxane comprises a fixed Si—O—Si bridge in the ladder skeleton. So the dimension and affinity of ladder rung are limited.

Known tube-like polymers includes, for example, those reported by S. Lijima in 1991(Nature, 1991, 354, 56), in which the preparation and structure of nano-scale carbon tubes having poor solubility in organic solvent is described. In 1995, H. Nakamura et al reported a tube-like polymer prepared by using siloxane gel as starting material. However the polymer is neither soluble nor meltable. In 1993, A. Harada et al reported the formation of tube-like organic polymers by using naturally occuring cyclodextrins as the starting materials (Nature, 1993, 364, 576). Because the dimension and the shape of the cyclodextrin unit are fixed, the diameter and chemical affinity of the tube-like polymers are also fixed and difficult to control. For the above reasons, the applications of these tube-like polymers are limited.

There have been reported a supermolecular complex based on tube-like cyclodextrins as host molecule (Nature, 1993, 364, 76). In such supermolecular complex, the pore diameter of the tube and chemical affinity of the cavity can not be readily adjusted, therefore, the guest molecules to be entrapped inside the tube are limited. Entrapment of metal ions or metal oxide molecules inside a nano-scale carbon tube to form the supermolecular complex has also been reported (Chem. Commun., 1995, 1335). However the preparation involves complicated steps and severe reaction conditions. In addition, the selectivity of entrapment was very poor. Further, entrapment of polyaniline inside the tube of $V_2O_5$ gel to form supermolecular complex has been reported (J. Am. Chem. Soc., 1989, 111, 4319). This complex showed electrical conductivity. However, since this supermolecular complex forms a cross-linked system, it is, neither soluble nor meltable, thus can not be reprocessed. In addition, the selectivity of entrapment was very poor too.

Chinese patent No. CN 9712236.9 (1997, 1) disclosed "tube-like organosilicon polymer and a method for producing the same". The tube-like organosilicon polymer can be prepared in (1+1) mode or (2+2) mode of tubing reaction. The (1+1) mode means that a coupling reaction of one kind of cis-isotactic reactive ladderlike polysilsesquioxane with another kind of cis-isotactic reactive ladderlike polysilsesquioxane. The (2+2) mode means that two parts of one kind of cis-isotactic reactive ladderlike polysilsesquioxane with two parts of low molar mass coupling agents. Because the tube-like polymer is resulted from the above-mentioned ladderlike polysiloxane having fixed Si—O—Si bridge, so the dimension, shape and chemical affinity of the tube-like organosilicon polymer are also limited. And also the guest molecules that can be entrapped inside the tube are limited.

SUMMARY OF THE INVENTION

The present invention is directed to solving the problems of the limited dimension and chemical affinity associated with the above-mentioned fixed Si—O—Si bridged ladderlike polysilsesquioxanes and tube-like polymers derived therefrom.

It is an object of the present invention to provide an organo-bridged ladderlike polysiloxane, which is characterized by:

(1) having an adjustable organo-bridged ladder rung which can play a templating role, namely, the length of the ladder rung varies in the range of 5–50 Å, and its chemical affinity can be adjusted;

(2) having terminal groups that can play a prefixation role such as hydroxy, carboxylic, amino amid and the like;

(3) having a cis-isotactic configuration and a high regularity (more than 80%);

(4) having a mono-dispersed molecular weights distribution in the range of $10^3$–$10^6$ Dalton;

(5) having reactive side groups such as hydrogen, halogen-containing group, alkenyl, substituted alkenyl, alkynyl, substituted alkynyl, aryl, or the like.

It is yet another object of the present invention to provide a method for producing the above-mentioned organo-bridged ladderlike polysiloxane.

It is a further object of the present invention to provide an organosilicon tube-like polymer obtained from the above-mentioned organo-bridged ladderlike polysiloxane and the producing method thereof.

It is still a further object of the present invention to provide a supermolecular complex obtained from the above-mentioned tube-like organosilicon polymer as host molecule and guest molecules entrapped inside the tube-like organosilicon polymer based on the dimension, shape and affinity of tube-like polymer, and the producing method thereof.

DISCLOSURE OF THE INVENTION

The organo-bridged ladderlike polysiloxane of the present invention is represented by the following formula:

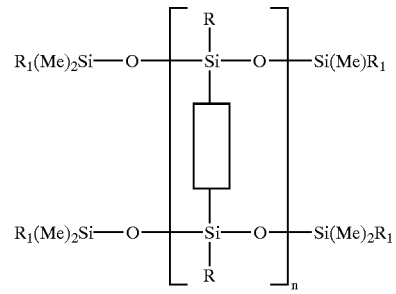

wherein, n is an integer from 10 to $10^5$, R is a reactive group selected from the group consisting of hydrogen, halogen-containing group, alkenyl, substituted alkenyl, alkynyl, substituted alkynyl, aryl, substituted aryl, —$C_6H_4OH$, —$C_6H_4NH_2$, —$C_6H_4N_2^+Cl^-$ and —$C_6H_4$—$C_6H_4N_2^+Cl^-$; $R_1$ is selected from the group consisting of a hydrogen-bonding producing group, a charge-transfer complex producing group, a metal ion-ligand complexes producing group, and an electrostatic interaction group;

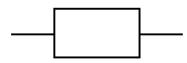

is one or more organo-bridged groups presented by the following formula:

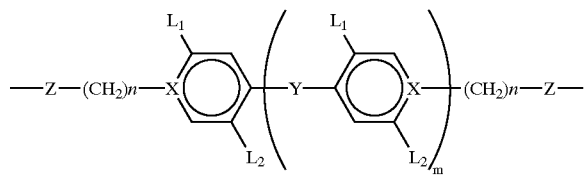

wherein

X is a carbon or a nitrogen atom, and when X is a nitrogen atom, Y is absent; Z is also absent; each of $L_1$ and $L_2$ is a hydrogen atom; m is 1; n is, 2, 3, 4, or 5;

when X is a carbon atom, Y is absent or is selected from the group consisting of —CONH—, —COCH$_2$CO—, and —COO—; Z is absent or is selected from the group consisting of —O—, —NH—, —CONH—, —COCH$_2$CO—, —COO—; $L_1$ and $L_2$ may be same or different and is selected from the group consisting of —H, —OH, —NH$_2$, and —CONH$_2$; m is 0, 1, or 2; n is 0, 1, 2, 3, 4 or 5.

In the organo-bridged ladderlike polysiloxane of the present invention, $R_1$ is preferably selected from the group consisting of hydroxy, nitro, amino, amide, quaternary ammonium cation, phenolic and carboxylic anions.

In the organo-bridged ladderlike polysiloxane of the present invention, the organo-bridged group or organo-bridged groups are preferably one of the following:

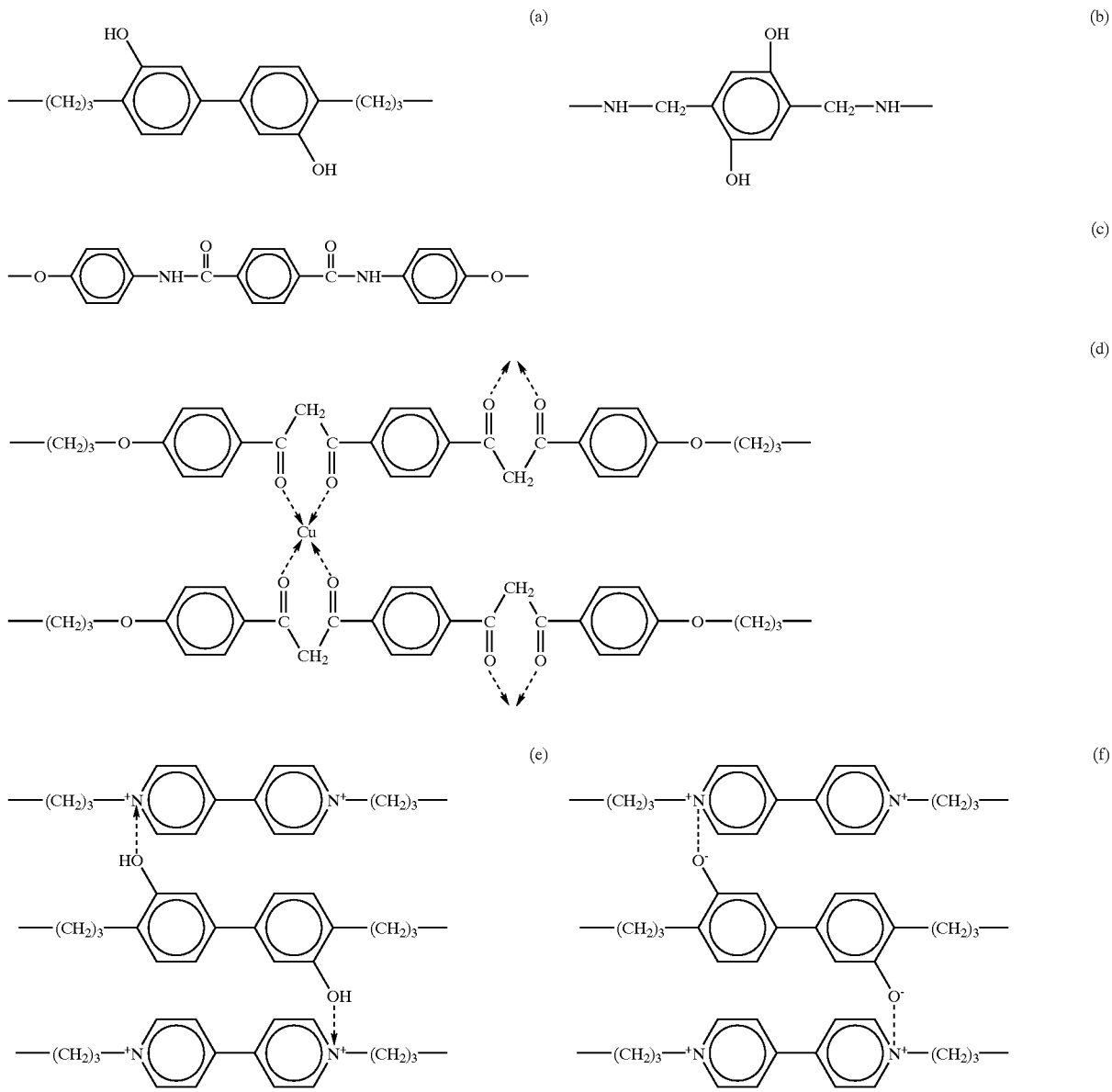

The above ladder rung can be divided into the following four categories:

(1) Hydrogen-bonding producing groups comprising hydroxy, amino or amide groups.
(2) Metal ion-ligand complexes producing groups consisting of the metal ions having square-planner coordination configuration such as cupric, palladic, nickelous cations or the like, and the coordinating ligand such as aromatic β-diketone, imine, azo-groups or the like.
(3) Charge-transfer complex producing groups consisting of the electron-donating groups such as hydroxy, amino, quinone, phenolic anion and carboxylic anions or the like, and the electron-accepting groups such as nitro, cyano, quinone, quaternary ammonium cation, phosphonium cation or the like.
(4) Electrostatic interaction producing groups consisting of the cations such as quaternary ammonium or a phosphonium cation and the anions such as carboxylic anion or phenolic anions or the like.

The above mentioned terminal group $R_1$ can also be divided into the following four categories:

(1) A hydrogen-bonding producing group such as a hydroxy, carboxylic, amino or amide group.
(2) A charge-transfer complex producing group consisting of a electron-donating group such as hydroxy, amino, hydroquinone, phenolic anion or a carboxylic anion and a electron-accepting group such as a nitro, cyano, quinone, quaternary ammonium cation or the like.
(3) A metal ion-ligand complex producing group consisting of a metal ion having square-planner coordination configuration such as cupric, palladic, nickelous cation or the like, and a coordinating ligand such as aromatic β-diketone, imine, azo-group or the like.
(4) An electrostatic interaction group consisting of a cation such as quaternary ammonium anion phosphonium anion and a anion such as carboxylic anion or phenolic anion or the like.

The ladderlike polysiloxane possesses cis-isotactic configuration. Its structural regularity is more than 80%. The molecular weight distribution is mono-dispersed and varies in the range of $10^3$–$10^6$. The length of the ladder rung is adjustable and varies in the range of 5–50 Å.

The present invention also relates to improving the structural regularity of the organo-bridged ladderlike polysiloxane. The method involves introducing the self-assembly into the polymerization process by using the above-mentioned organo-bridged ladder rung as template. Via the template interaction between the adjacent ladder rungs, the organosilicon monomers are well-oriented and self-assembled before polymerization takes place. Thus an ordered architecture can be formed during the polymerization process. It leads to high regularity of the ladderlike polysiloxanes of the present invention. The template interactions between the ladder rungs mentioned in the present invention include (1) hydrogen-bond effect (2) charge-transfer interaction (3) metal ion-ligand interaction (4) electrostatic interaction.

In another aspect of the present invention, there is provided a method for preparation of the organo-bridged ladderlike polysiloxane of the present invention, comprising the steps of:

1. Synthesis of the Organosilicon Monomer Containing Organo-bridged Group (1) synthesizing the organo-bridged organosilicon monomer by a coupling reaction of trihalogensilane or trialkoxysilane with α,ω-difunctional coupling agent, the monomer being represented by

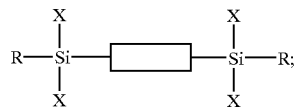

(2) hydrolysing the above-mentioned organo-bridged organosilicon monomer to obtain an intermediate compound represented by

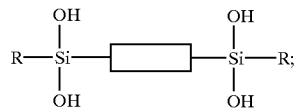

(3) polycondensing the above-mentioned hydrolysis product to obtain an organo-bridged ladderlike polysiloxane represented by

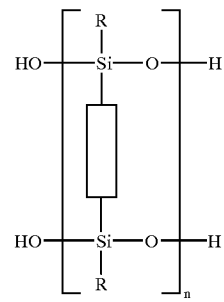

(4) end-capping the above-mentioned organo-bridged ladderlike polysiloxane with functional organosilicon compound to obtain the end-capped organo-bridged ladderlike polysiloxane represented by

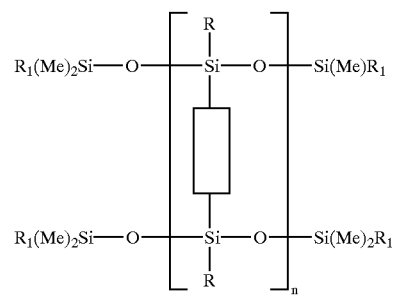

(5) carrying out fractional precipitation to obtain a mono-dispersed organo-bridged ladderlike polysiloxane wherein, X is halogen atom or alkoxy group; R is a reactive group selected from the group consisting of hydrogen, halogen-containing group, alkenyl, substituted alkenyl, alkynyl, substituted alkynyl, aryl, substituted aryl, —$C_6H_4OH$, —$C_6H_4NH_2$, —$C_6H_4N_2{}^+Cl^-$ and —$C_6H_4$—$C_6H_4N_2{}^+Cl^-$; n is an integer from 10 to $10^5$.

Specifically, the method of the present invention includes the following steps:

(1-1) Synthesizing the Organosilicon Monomer by Hydrosilylation Reaction

One of the alkenyl- or alkynyl-terminated compound having the following formula

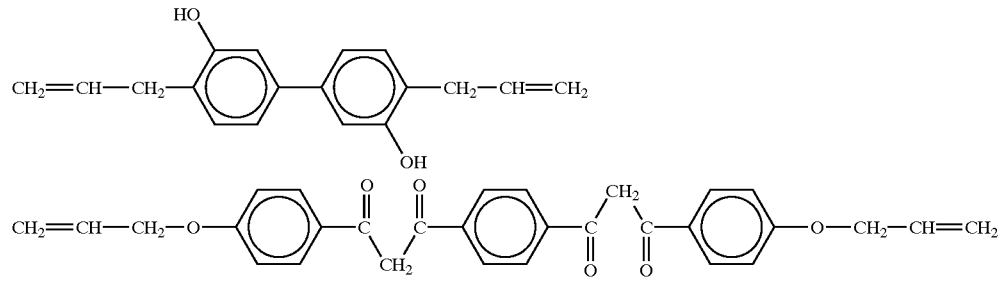

is dissolved in tetrafuran (THF). Under the argon atmosphere platinum compound catalyst is added into the THF solution. After stirring the mixture for 30 minutes at room temperature, another compound containing hydrosilyl group is added. The molar ratio of the alkenyl- or alkyl-terminated compound to hydrosilane is 1:2–1:6. The above mixture is stirred at 40° C. for 24–48 hours and then the organo-bridged organosilicon monomer is obtained. It is represented by following formulas:

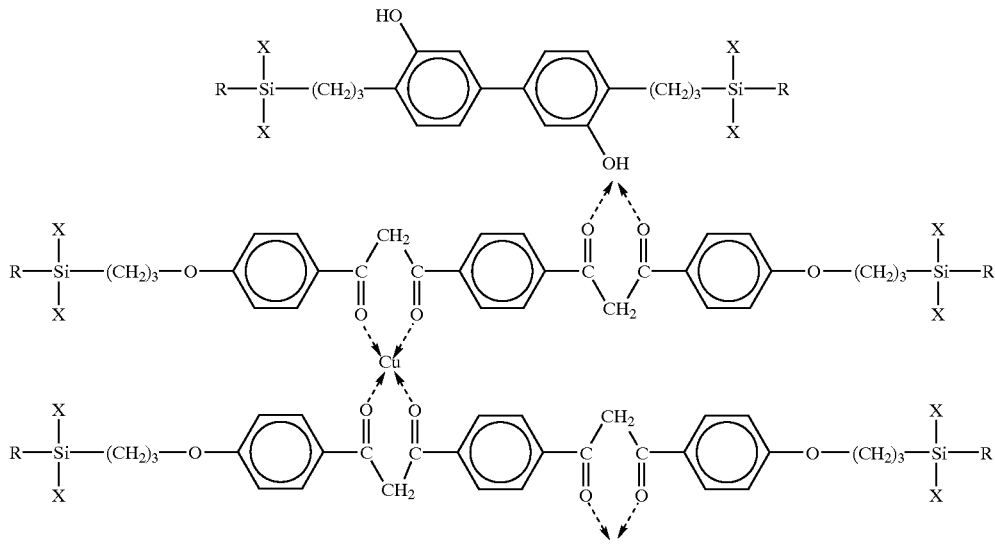

wherein R represents a reactive groups such as alkyl, substituted alkyl or the like. X represents a halogen atom (Cl, Br, I) or a alkoxy group such as a methoxy or a ethoxy group.

The platinum compound catalyst used in the present invention for hydrosilylation reaction includes $Cp_2PtCl_2$, $H_2PtCl_6$ and complexes thereof.

The molar ratio of the platinum catalyst to alkenyl-terminated compound or alkynyl-terminated compound in the present invention is $10^{-6}$–$10^{-4}$.

(1-2) Synthesizing the Organosilicon Monomer by Condensation Reaction

Under argon atmosphere, a solution of α,ω-difunctional compound such as α,ω-diphenol

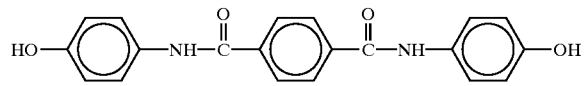

in THF (0.2–0.8 mmol/mL) is added dropwise into the THF solution containing organotrichlorosilane and pyridine used as the hydrochloride-absorbing agent. The molar ratio of α,ω-diphenol to the alkenyltrichlorosilane is 1:2–1:6. The reaction system is stirred at the refluxing temperature for another 1–5 hours. After the reaction is completed, the pyridine hydrochloride salt is filtered off. The filtrate is vacuum-distilled and then a organo-bridged silicon monomer is obtained. Its chemical structure is represented by the following formulas:

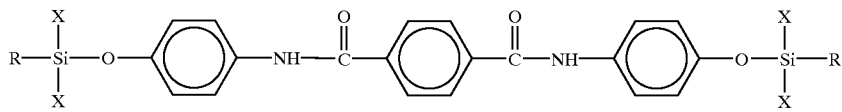

wherein R represents a reactive groups such as alkenyl, a substituted alkenyl, alkynyl, substituted alkynyl, X represents halogen atom (Cl, Br, I) or alkoxy group.

2. Hydrolysis of the Organo-bridged Organosilicon Monomer

The above-mentioned organosilicon monomer is dissolved in a mixed solvent, such as toluene and acetone or THF. The volume ratio of toluene to acetone or THF is 1.5:1–4:1. The concentration of organosilicon monomer is 0.05–0.3 mmol/mL. A solution of water in acetone or THF is added dropwise into the above mixed solvent. Then the reaction mixture is stirred at room temperature for 3–6 hours.

3. Polycondensation of the Hydrolysis Product

A catalysts such as sulfuric acid or triethylamine and water-adsorbing agent such as anhydrous sodium sulfate or molecular sieve (4 Å) are added into the above-mentioned hydrolyzed solution. After stirring the solution at 50° C. for 1–5 days, the solution is washed with distilled water until neutralized, then dried over anhydrous sodium sulfate or the molecular sieve and further stirred at 40–60° C. for 1–5 days.

4. End-capping the Ladderlike Polymer

The above-mentioned condensation product should be treated with different kinds of capping agents possessing functional groups to produce hydrogen bonding, charge transfer complex, metal ion-ligand complex, electrostatic interactions. Thus, for example, after the condensation reaction is completed, the resulted solution is washed with distilled water until neutralized and dried over anhydrous sodium sulfate or molecular sieve, then pyridine is added. A solution of dimethyldichlorosilane in toluene (concentration: 0.1 mol/L) is added dropwise under stirring into the above solution. The molar ratio of end-capping agent of dimethyldichlorosilane to the organosilicon monomer in the present invention is in the range of $1 \times 10^{-7} - 1 \times 10^{-1}$. The reaction mixture is further stirred at room temperature for 8 hours. The pyridine hydrochloride formed is filtered out and the resulted solution is washed with distilled water until neutralized and dried over anhydrous sodium sulfate or molecular sieve.

5. Fractional Precipitation of the Ladderlike Polymer

The above-mentioned toluene solution of organo-bridged ladderlike polysiloxane is subject to fractionation precipitation with methanol to obtain the mono-dispersed ladderlike organo-bridged polysiloxane.

The main properties of the organo-bridged ladderlike polysiloxanes of the present invention are listed in Table 1.

TABLE 1

| Properties of organo-bridged ladderlike polysiloxanes | |
|---|---|
| Ladder skeleton dimension (Å) | 5–50 |
| Appearance | Colorless and transparent solid |
| Chemical affinity | Easily adjusted between hydrophlicity and hydrophobicity |
| Solubility | Soluble in organic solvent such as toluene, THF, acetone, methylene chloride, etc |
| Molecular weight (by VPO & GPC) | $10^3 – 10^6$ |
| Synthetic yield | 70–95% |
| Structural regularity (by $^{29}$Si-NMR) | >80% |

The organo-bridged ladderlike polysiloxane of the present invention is highly regulated. Its skeleton dimension and chemical affinity are adjustable. It is highly soluble in organic solvents. Thus, it has potential applications in inorgno-organo hybrid materials, nonlinear optical materials, electronic materials, organosilicon tube-like polymers, and supramolecular complexes.

The present invention further provides a tube-like organosilicon polymer derived from the organo-bridged ladderlike polysiloxane of the present invention, which is represented by the following formula:

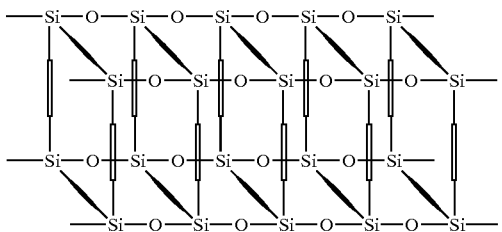

wherein ● is the bridge group connecting two main chains of ladderlike polymers. This group includes —(CH$_2$)$_3$SiOSi(CH$_2$)$_3$—, —C$_6$H$_4$N=NC$_6$H$_4$—, —(CH$_2$)$_m$Si(CH$_3$)$_2$C$_6$H$_4$OC$_6$H$_4$(CH$_3$)$_2$Si(CH$_2$)$_m$— (m=2,3) and the like wherein ☐ is the organ-bridged ladder rung of the ladderlike polymer itself, which has the same definition with the organ-bridged group mentioned above.

In a further aspect of the present invention, there is provided a method for preparing the tube-like organosilicon polymer of the present invention. The organo-bridged ladderlike polysiloxanes can be formed through one of the following three procedures: 1) Via intra-macromolecular cyclization of the organo-bridged ladderlike polysiloxane having reactive side groups; 2) In (1+1) mode of coupling reaction between two organo-bridged ladderlike polysiloxanes having reactive side groups; 3) In (2+2) mode of coupling reaction between two organo-bridged ladderlike polysiloxanes with the same reactive side groups and the coupling reagents.

Specifically, the tube-like organosilicon polymer of the present invention is prepared by the following method:

1) Via intra-macromolecular cyclization using above-mentioned organo-bridged ladderlike polysiloxane having reactive side groups as the starting materials:

The above-mentioned intra-macromolecular cyclization includes the following types: (1) hydrosilylation cyclization reaction; (2) diazo coupling cyclization reaction; (3) Ulman or Grignard coupling cyclization reaction.

(1-1) Hydrosilylation cyclization reaction

The organo-bridged ladderlike polysiloxane having —CH=CH$_2$ or —CH$_2$—CH=CH$_2$ side groups is dissolved in dried solvent. Under the inert gas atmosphere the above ladderlike polysiloxane is added into a reaction vessel. Solvent, Pt compound catalyst and trichlorosilane or trimethoxysilane or triethoxysilane are added to the reaction mixture. The concentration of reactants are in the range of 5~40 mg/mL. The molar ratio of ladderlike polysiloxane to trichlorosilane (or trimethoxysilane or triethoxysilane) is 1:0.8 to 1:1.5. The reaction is carried out at 40~100° C. for 12~72 hours. After the reaction is completed, a solution of α,ω-diamine and triethylamine is added to the reaction mixture at −5~−15° C. in 4 hours. Then a water-containing solution is added dropwise at −5~−10° C. over 5 hours. After addition, the reaction mixture is gradually warmed to room temperature and kept stirring for another 10 hours. After removal of salts, the residue solution is dried over anhydrous Na$_2$SO$_4$. The molar ratio of trichlorosilane (or trimethoxysilane or triethoxysilane) to α,ω-diamine and to triethylamine is 1:1:2. The molar ratio of trichlorosilane (or trimethoxysilane or triethoxysilane) to water is 1:2. The polycondensation process is carried out using Me$_4$NOH as catalyst. The solution was stirred at 50~90° C. for 36~144 hours. Then the above solution is washed with aqueous solution of NaCl until neutralized and dried over anhydrous Na$_2$SO$_4$. After removal of solvent, a tube-like organosilicon polymer is obtained.

The Pt compound catalysts used for hydrosilylation cyclization reaction are $H_2PtCl_6 \cdot 6H_2O$ or $Cp_2PtCl_2$ or their complexes.

The solvents that can be used in hydrosilylation cyclization reaction include toluene, xylene, ethylene glycol dimethyl ether, poly(allyl ether), dimethyl o-phthalate, 1,4-dioxane, tetrahydrofuran (THF), acetone, cyclohexanone or a mixture of above solvents. The amount of the solvent(s) is 50~500 mL/ per gram of ladderlike polysiloxane.

(1-2) Diazo coupling cyclization reaction

The organo-bridged ladderlike polysiloxane having both —$C_6H_4OH$ and diazo side groups is dissolved in inorganic or a mixture of inorganic and organic solvents. The concentration is 30~45%. The above solution is added to the reaction mixture. The ice is added to the reaction mixture. The weight ratio of the ice to solvent is 1:3. Sodium acetate or acetic acid is added to the reaction mixture. The reaction is allowed to proceed at 0~–5° C. by ice-water. After the reaction, the reaction solution is extracted by diethyl ether. The ether solution was dried over anhydrous $Na_2SO_4$. After the removal of solvent, a tube-like organosilicon polymer is obtained.

The inorganic solvent or a mixture of inorganic and organic solvents used in the diazo coupling cyclization reaction include water, mixture of water and alcohol, mixture of water and pyridine or mixture of water and acetic acid and the like.

(1-3) Ulman or Grignard cyclization coupling reaction

The organo-bridged ladderlike polysiloxane having —$C_6H_4C_6H_4C_6H_4I$ or —$C_6H_4C_6H_4Br$ side groups is dissolved in dried organic solvents under argon atmosphere. The concentration is 1~10 wt. %. Then the above solution is added dropwise to the reaction mixture containing a Cu or Mg powder and a small amount of $I_2$ at 0~–5° C. The molar ratio of ladderlike polysiloxane to Cu or Mg powders is 1:1~1:5. The reaction is allowed to proceed at 0~–5° C. by ice-water for 2~5 hours and then warmed up gradually till reflux for 5~9 hours. The reaction solution is extracted with hexane after cooling. Then the hexane solution is dried over anhydrous $Na_2SO_4$. After the removal of solvent, a tube-like organosilicon polymer is obtained.

The organic solvents can be used in the Ulman or Grignard cyclization reaction include toluene, xylene, ethylene glycol dimethyl ether, poly(allyl ether), dimethyl o-phthalate, 1,4-dioxane, tetrahydrofuran (THF), acetone, cyclohexanone or a mixture of above solvents.

2) In (1+1) mode of coupling reaction between the above-mentioned two organo-bridged ladderlike polysiloxanes having different reactive side groups.

3) In (2+2) mode of coupling reaction between two organo-bridged ladderlike polysiloxanes with the same reactive side groups and the coupling reagents.

The above-mentioned (1+1) or (2+2) mode of coupling reaction include the following types (1) hydrosilylation coupling reaction,: (2) diazo coupling reaction. (3) Ulman or Grignard coupling reaction and the like.

(1) Hydrosilylation coupling reaction (1-1) In (1+1) mode of hydrosilylation coupling reaction, the synthetic procedure is as follows: Two organo-bridged ladderlike polysiloxanes having —CH=$CH_2$ or —$CH_2$—CH=$CH_2$ side groups and Si—H side groups are dissolved in dried solvents, respectively. Then under the inert gas atmosphere they are added with the molar ratio of 1:0.8 to 1:1.5 into a reaction apparatus. Solvent and Pt catalyst are added to the reaction mixture. The concentration of reactants are in the range of 10~40 mg/mL. The reaction is allowed to proceed at 40~100° C. for 12~72 hours. After the removal of solvent, a tube-like organosilicon polymer is obtained.

(1-2) In (2+2) mode of hydrosilylation coupling reaction, the synthetic procedure is as follows: An organo-bridged ladderlike polysiloxane having —CH=$CH_2$ or —$CH_2$—CH=$CH_2$ side chains or having Si—H side chains is dissolved in dried solvent and is injected into a reaction apparatus under inert gas atmosphere. Then the solvent, Pt catalyst and the coupling reagent with terminal Si—H groups or terminal alkenyl or alkynyl groups are added to the reaction mixture. The concentration of reactants are in the range of 5~40 mg/mL. The molar ratio of ladderlike polysiloxane to the coupling reagent is 1:0.8 to 1:1.5. The reaction is carried out at 40~100° C. for 12~72 hours. After the removal of solvent, a tube-like organosilicon polymer is obtained.

The Pt catalysts that can be used in the present invention for hydrosilylation reaction are $H_2PtCl_6 \cdot 6H_2O$ or $Cp_2PtCl_2$.

The solvents that can be used in hydrosilylation reaction include toluene, xylene, ethylene glycol dimethyl ether, poly(allyl ether), dimethyl o-phthalate, 1,4-dioxane, tetrahydrofuran (THF), acetone, cyclohexanone or a mixture of above solvents. The amount of the solvent(s) is 50~500 mL/per gram of ladderlike polysiloxane.

The coupling agents having terminal alkenyl or alkynyl groups that can be used have the following structure:

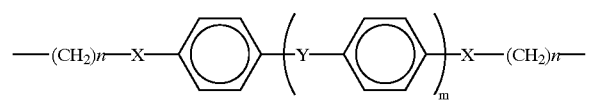

wherein n is 0, 1, or 2; m is 0 or 1; X is O, COO or is absent; Y is O, $(CH_3)_2C$ or is absent.

The coupling reagents having Si—H group that can be used in the hydrosilylation reaction include the following 4 categories:

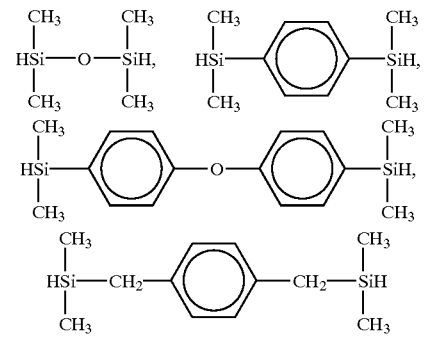

(2) Diazo coupling reaction

The organo-bridged ladderlike polysiloxane having —$C_6H_4OH$ or —$C_6H_4$—$NH_2$ side groups is dissolved in inorganic or a mixture of inorganic and organic solvents. The concentration is 10~50 wt. %. The above solution is added to the reaction mixture. Then ice is added to the reaction mixture. The weight ratio of the ice to solvent is 1:3. Sodium acetate or acetic acid is added to the reaction mixture. The reaction is allowed to proceed at 0~5° C. by ice-water. The organo-bridged ladderlike polysiloxane having diazo side groups in inorganic or a mixture of inorganic and organic solvents with a concentration of 10~50% is added dropwise to the flask under stirring. After the reaction, the reaction solution is extracted by diethyl ether. The ether solution was dried over anhydrous $Na_2SO_4$. After the removal of solvent, the tube-like organosilicon polymer is obtained in (1+1) mode.

The inorganic solvent or a mixture of inorganic and organic solvents that can be used in the diazo coupling reaction include water, mixture of water and alcohol, mixture of water and pyridine or mixture of water and acetic acid.

When using organo-bridged ladderlike polysiloxane having —$C_6H_4OH$ side groups as the starting material during the diazo coupling reaction, the reaction should be carried out at weak base solution with a pH value of 8~10. When using organo-bridged ladderlike polysiloxane having —$C_6H_4NH_2$ side groups as the starting material during the diazo coupling reaction, the reaction should be carried out at weak acid solution with a pH of 5~7.

The microstructure and chemical affinity of the tube-like organosilicon polymers derived from organo-bridged ladderlike polysiloxanes of the present invention can be readily adjusted (Table 1). Further, due to their solubility in organic solvents, the tube-like organosilicon polymers can be processed easily. These solvents include toluene, xylene, ethylene glycol dimethyl ether, poly(allyl ether), dimethyl o-phthalate, 1,4-dioxane, tetrahydrofuran (THF), acetone, cyclohexanone or a mixture of above solvents.

(3) Ulman or Grignard coupling reaction.

The organo-bridged ladderlike polysiloxane having —$C_6H_4C_6H_4C_6H_4I$ or —$C_6H_4C_6H_4Br$ side groups is dissolved in dried organic solvents under argon atmosphere. The concentration is 10~50 wt. %. Then the above solution is added dropwise to the reaction mixture containing Cu or Mg powders and a littler amount of $I_2$ at 0~−5° C. The molar ratio of ladderlike polysiloxane to Cu or Mg powders is 1:1–1:5. The reaction is allowed to proceed at 0~−5° C. by ice-water for 2~5 hours and then warmed up gradually till reflux for 5~9 hours. The reaction solution is extracted with hexane after cooling. Then the hexane solution is dried over anhydrous $Na_2SO_4$. After the removal of solvent, a tube-like organosilicon polymer is obtained.

The organic solvents can be used in the Ulman or Grignard cyclization reaction include toluene, xylene, ethylene glycol dimethyl ether, poly(allyl ether), dimethyl o-phthalate, 1,4-dioxane, tetrahydrofuran (THF), acetone, cyclohexanone or a mixture of above solvents.

The properties are shown in Table 2.

TABLE 2

The main properties of tube-like organosilicon polymers

| Item | Tube-like organosilicon polymers |
|---|---|
| Appearance | Colorless and transparent solid |
| Molecular weight (by GPC and VPO) | $10^3 \sim 10^6$ |
| IR (in $cm^{-1}$) | 1) Almost disappearance of Si-H peak and alkenyl or alkynyl peak |
| | 2) Almost disappearance of —$C_6H_4OH$ or —$C_6H_4$-$NH_2$ peak; almost disappearance of —$C_6H_4N_2^+Cl^-$ or —$C_6H_4N=NC_6H_4N_2^+Cl^-$ peak |
| $^1$H-NMR, $^{13}$C-NMR, $^{29}$Si-NMR (in ppm) | 1) Almost disappearance of Si-H peak and alkenyl or alkynyl peak |
| | 2) Almost disappearance of —$C_6H_4OH$ or —$C_6H_4$-$NH_2$ peak; almost disappearance of —$C_6H_4N_2^+Cl^-$ or —$C_6H_4N=NC_6H_4N_2^+Cl^-$ peak |
| XRD (in nm) | $d_1$ for the tube-like polymer is larger than that for ladderlike polymer, indicating the long-range order of tube-like structure is increased |
| DSC | Tube-like macromolecules possess relative rigidity |

TABLE 2-continued

The main properties of tube-like organosilicon polymers

| Item | Tube-like organosilicon polymers |
|---|---|
| AFM | Molecules are streak arranged, the diamater of the tube is larger than the width of molecular width, but it is slightly shorter than the molecular simulation value |
| Inner diameter (nm) | 0.5 ~ 8 |
| Outer diameter (nm) | 1 ~ 10 |
| Chemical affinity | Adjustable between hydrophilicity and lyophilicity |

The present invention further provides a tube-like organosilicon polymeric complex derived from the organo-bridged ladderlike polysiloxane of the present invention, which is represented by the following formula:

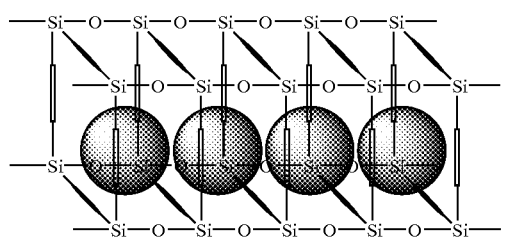

Wherein, ● is the low molar mass guest molecule, metal ion or polymer entrapped inside the tube.

The method for producing the tube-like organosilicon polymeric complexes of the present invention includes entrapping the guest molecules into the tube-like organosilicon polymers to form supermolecular complexes. Two methods can be used in performing the entrapment: in-situ entrapment and displacement entrapment. Guest molecules are either low molar mass molecules with functionality or metal ions.

The in-situ entrapment is referred to simultaneous tube formation and entrapment of the guest molecules. It is carried out according to the following procedures: During the tube-like organosilicon polymer formation process by one of the above-mentioned methods, guest molecules or ions are added in-situ. The weight of guest molecule iis 1~30 wt. % of that of tube-like organosilicon polymers. The reaction conditions are similar to those used above. When the tube-like polymers are formed the guest molecules possessing excellent molecular recognition ability (i.e. molecular dimension and chemical affinity) with tube-like polymers are simultaneously entrapped in-situ inside the tube to give the supermolecular complexes.

The structure of the organo-bridged ladderlike polysiloxane to be used is mentioned above.

The solvents may be used include toluene, xylene, ethylene glycol dimethyl ether, poly(allyl ether), dimethyl o-phthalate, 1,4-dioxane, tetrahydrofuran (THF), acetone, cyclohexanone, alcohols or a mixture of above solvents.

The displacement entrapment is performed according to the following procedures. The tube-like organosilicon polymers derived from the organo-bridged ladderlike polysiloxane and the guest molecules as mentioned above are dissolved in organic solvent(s). The weight of guest molecules is 1~20% of that of tube-like organosilicon polymers. The amount of the solvent used is 1~50 mL per gram of tube-like polymers. The guest molecules are entrapped inside the tube by ultrasonic (1 KHz~200 KHz), heating (20~200° C.), or by changing the polarity of the solvent, to replace the solvent molecules or other molecules originally entrapped inside the tube.

The solvents that can be used include toluene, xylene, ethylene glycol dimethyl ether, poly(allyl ether), dimethyl o-phthalate, 1,4-dioxane, tetrahydrofuran (THF), acetone, cyclohexanone, alcohols or a mixture of above solvents.

The polymeric complexes of the present invention is soluble in a variety of solvents, therefore allows to be reprocessed. These solvents include toluene, xylene, ethylene glycol dimethyl ether, poly(allyl ether), dimethyl o-phthalate, 1,4-dioxane, tetrahydrofuran (THF), acetone, cyclohexanone, isopropanol, isobutanol, or a mixture thereof.

BEST MODE FOR CARRYING OUT THE INVENTION

The following examples are intended to describe the present invention in further details and should by no means be interpreted as defining the scope of the invention.

EXAMPLE 1

To a 250 mL flask 3.7 g (13.8 mmol) of $CH_2$=CH—$CH_2$NHCOC$_6$H$_4$CONH—$CH_2$—CH=$CH_2$ is added. The reaction system is vacuumed and refilled with argon. This process is repeated for three times. Under the argon atmosphere and stirring, 30 mL THF and 3 mL of a solution of $Cp_2PtCl_2$ (1 mg/mL) are injected into system. After stirring the reaction mixtures at room temperature for 30 minutes, 13.8 g (30.4 mmol) of I($C_6H_4$)$_3$Si(H)Cl$_2$ is added. The mixture is further stirred at 40° C. for 24 hours. Then the solvents and unreacted compounds are distilled out under vacuum condition, and 6.5 g (13.7 mmol) of resultant organosilicon monomers are obtained.

The above monomer is dissolved in a mixed solvent of toluene and acetone (volume ratio 4:1). A mixed solution of 1 mL water and 30 mL acetone is added dropwise into the monomer solution over 6 hours under ice-water bath. The reaction mixture is stirred at room temperature for 3–6 hours. Then after removing acetone under reduced pressure, five drops of sulfuric acid and certain amount of anhydrous sodium sulfate are added. The mixture is further stirred at 30–60° C. for 72 hours, then washed with distilled water until neutralized, dried over anhydrous sodium sulfate overnight, and at last a condensation product is obtained.

To the above condensation products, 20 mL of a solution of 0.02 g (0.18 mmol) dimethyldichlorosilane in toluene and 4.2 mg of (0.18 mmol) pyridine are added. The reaction mixture is stirred at room temperature for 8 hours, then washed with distilled water until neutralized, dried over anhydrous sodium sulfate, and finally a colorless and transparent solution of ladder-like polymethylsiloxane with —($CH_2$)$_3$NHCOC$_6$H$_4$CONH($CH_2$)$_3$-bridge and —($C_6H_4$)$_3$I side groups is obtained in the yield of 95%. The concentration of the polymethylsiloxane is 57 mg/mL. Molecular weight (determined by GPC) of the polymethylsiloxane is $2.7 \times 10^4$. Regularity (measured by $^{29}$Si-NMR) of the polymethylsiloxane is 82%.

EXAMPLE 2

6.5 g of —($CH_2$)$_3$NHCOC$_6$H$_4$CONH($CH_2$)$_3$-bridged ladderlike polysiloxane having —$C_6H_4C_6H_4C_6H_4$I side groups which has been synthesized in Example 1 is dissolved in 100 mL of dried THF under argon atmosphere. Then the above solution is added dropwise to the reaction mixture containing Cu powders and a littler amount of $I_2$ at 0~–5° C. The molar ratio of ladderlike polysiloxane to Cu powders is 1:1–1:5. The reaction is allowed to proceed at 0~–5° C. by ice-water for 2~5 hours and then warm up gradually till reflux for 5~9 hours. The reaction solution is extracted by hexane after cooling. The hexane solution is dried over anhydrous $Na_2SO_4$. After removal of solvent in the above dried solution under vacuum condition, 5.7 g of light yellow solid product is obtained, which can be re-dissolved in THF. Yield is 89%. In IR and $^1$H-NMR spectra, the —$C_6H_4C_6H_4C_6H_4$I peak almost disappear, indicating the completeness of the reaction.

EXAMPLE 3

To a 500 mL of three-necked flask is placed a stir bar. The reaction system is vacuumized and refilled with argon. This process is repeated for three times. Under the argon atmosphere, 300 mL of isopropanol is injected into the system through a syringe. Then 50 mL of a solution of organo-bridged ladderlike polysiloxane which is the same as that in Example 1 in THF (concentration: 50 mg/mL), 4 mg of $(Ph_3P)_4Pt$, 0.1 g of azobenzene and 11 mL of a solution of HMM in THF (concentration: 1 mL of HMM/ 10 mL of THF) are added into the system successively. The reaction is carried out at 60~70° C. for 36~48 hours. After reaction the majority of the solvent is evaporated and the product (2.6 g) is precipitated from methanol for several times. Yield 86%. Re-dissolving of the precipitate in THF and casting it on glass gives a homogeneous and transparent film. The IR spectrum of the product indicates the completeness of the reaction. The $T_g$ peak of disappeares on DSC measurement. The benzene peaks of azobenzene appear in the IR spectrum. All these results indicate that azobene is entrapped inside the tube-like polymers.

EXAMPLE 4

1 g of dried solid tube-like organosilicon polymers which has been synthesized in Example 2 is dissolved in 20 mL of cyclohexanol. Then 100 mg of polyaniline was added. The mixture was ultrosonicated for two hours and then stayed overnight. The cyclohexanol was first evaporated to almost dryness and then further evaporated to complete dryness under vacuum. The product was washed with methanol three times. In IR and $^1$H-NMR spectra there were peaks of polyaniline. In UV spectrum the absorption peaks of polyaniline shifted to blue. All these indicated that polyaniline was entrapped inside tube-like polymers to form supermolecular complexes.

EXAMPLE 5

To a 500 mL flask 60 g of 3-bromopropylvinyldimethoxysilane in 100 mL of THF is added. 40 g of 4,4'-bipridine is dissolved in 100 mL of THF, to which then a spoon of calcium hydride is added to remove water. After the reaction stooped (no more gas bubbled out) the mixture is filtered to yield a clear anhydrous 4,4-bipridine solution, which is added dropwise at 80° C. under stirring to the above reaction flask containing 3-bromopropylvinyldemethoxylsilane. The reaction mixture is stirred at 80° C. for 72 hours. The N,N'-Bis(3-vinyldimethoxysilylpropyl)-4,4'-bipyridinium dibromide salt

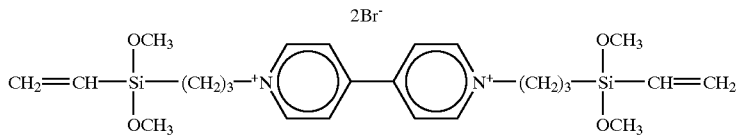

is precipitated.

Another organosilicon monomer

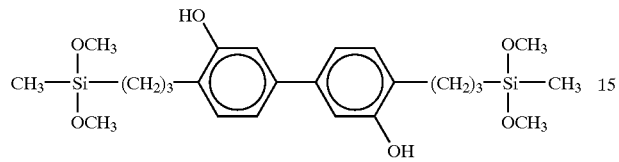

is prepared in the similar manner as in Example 1 excepting using methylhydrodimethoxylsilane instead of iodopropylhydrodimethoxylsilane. These two monomers are hydrolyzed simultaneously and copolymerized using a mixed solvent of acetonitrile and acetone (volume ratio 3:1). To this solution 0.02 g (0.18 mmol) of dimethyldichlorosilane and 0.014 g (0.18 mmol) of pyridine in 20 mL toluene are added dropwise over 3 hours. Then solution is further stirred at room temperature for 8 hours. After the reaction is completed, the resultant solution is washed with distilled water until neutralized and dried over anhydrous sodium sulfate overnight. Finally, a yellow and transparent solution of ladderlike polylsiloxane with the following structure as ladder rung

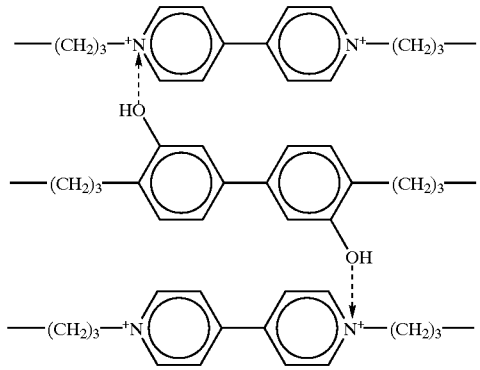

is obtained in the yield of 57%. The solution concentration of the polysiloxane is 15 mg/mL. Its molecular weight (determined by GPC) is 1,×10$^4$ and the regularity (measured by $^{29}$Si-NMR) is 91%.

EXAMPLE 6

To a 500 mL three-necked flask is placed a magnetic stir bar. The reaction system is vacuumized and refilled with argon for three times. Under the argon atmosphere, 100 mL of toluene, 2.2 g of organo-bridged ladderlike polysiloxane which has been synthesized in Example 5, and 1.05 g of trichlorosilane are injected into the system with syringes. Then 0.5 mg of catalyst Cp$_2$PtCl$_2$ is added. The reaction is carried out at 40° C. for 48 hours. After the reaction, a THF solution containing 0.42 g of p-phenylenediamine and 0.78 g of triethylamine is added to the reaction mixture at −5~−15° C. in 4 hours. Then a THF solution containing 0.14 g of water is added dropwise at −5~−10° C. over 5 hours. After addition, the reaction mixture is gradually warmed to room temperature and kept stirring for another 10 hours. After removal of salts, the residue solution is dried over anhydrous Na$_2$SO$_4$. The polycondensation process is carried out using Me$_4$NOH as catalyst. The solution was stirred at 50~90° C. for 78 hours. Then the above solution is washed with aqueous solution of NaCl until neutralized and dried over anhydrous Na$_2$SO$_4$. After removal of solvent, 1.7 g of white solid tube-like organosilicon polymer is obtained in the yield of 79%. In IR and $^1$H-NMR spectra, the Si—H peak, Vi-Si peak and Cl—Si peak almost disappear, indicating the completeness of the reaction.

EXAMPLE 7

To a Schlenk flask are placed 6 mg (MW~5000) of poly(vinyl alcohol), and a magnetic stir bar. The reaction system is vacuumized and refilled with argon. This process is repeated for three times. Under the argon atmosphere, 10 mL of isopropanol is injected into the system through a syringe. After poly(vinyl alcohol) is dissolved completely, 1 mL of a solution of organo-bridged ladderlike polyvinylsiloxane which has been synthesized in Example 5 in toluene (concentration: 68 mg/mL), 0.1 mg of Cp$_2$PtCl$_2$, and 1.2 mL of a solution of 1,1,3,3-tetramethyldisiloxane (HMM) in THF (concentration: 0.04 mL of HMM/mL of THF) are added into the system successively. The reaction temperature is controlled at 60~80° C. for 24 hours. 50 mg of white solid product is obtained after washed with water and methanol. Yield is 87%. The IR spectrum of the product indicates the completeness of the reaction. The T$_g$ peak of poly(vinyl alcohol) disappeares on DSC measurement. The peaks of poly(vinyl alcohol) appeares in the $^1$H-NMR spectrum. All these results indicate that poly(vinyl alcohol) is entrapped inside the tube-like polymers.

EXAMPLE 8

1 g of dried solid tube-like organosilicon polymers which have been synthesized in Example 6 is dissolved in 20 mL of cyclohexanone. The solution is ultrosonicated for two hours and then stayed overnight. The cyclohexanone is first evaporated to almost dryness and then evaporated to dryness under vacuum to give 1.05 g of white solid product. Yield 94%. In $^1$H-NMR spectrum of the product there are peaks of cyclohexanone molecule, which are broadened and shifted about 0.1 ppm up-field compared to those of pure cyclohexanone. In addition, the peaks of THF originally entrapped inside the polymers become smaller. All these indicate that cyclohexanone molecule is entrapped inside the tube-like polymers.

EXAMPLE 9

The apparatus and reaction procedure in Example 9 is the same as those in Example 6, but trimethoxysiloxane is used instead of trichlorosiloxane. White solid product is obtained, which can re-dissolve in THF. In IR and $^1$H-NMR spectra, the Si—H peak, Vinyl-Si peak and MeO-Si peak almost disappeared, indicating the completeness of the reaction.

EXAMPLE 10

1 g of dried solid tube-like organosilicon polymers which has been synthesized in Example 9 is dissolved in 20 mL of chloroform. Then 1 mL of poly(methylhydrosiloxane) is added. The mixture is ultrosonicated for two hours and then stays overnight. Methanol is added to the solution to precipitate the tube-like complexes. The solution is then centrifuged. The upper layer is decanted and the precipitate is washed with methanol three times. The solvent is evaporated to dryness to give 1.7 g of white solid product in the yield of 83%. In IR spectrum there is absorption peak of Si—H bond and it is shifted to red for about 2 cm$^{-1}$. In $^{29}$Si-NMR spectrum the Si—H peak shifted about 3~4 ppm down-field. In GPC spectrum the peak of guest molecules disappeares. All these indicate that poly(methylhydrosiloxane) is entrapped inside tube-like polymers to form supermolecular complexes.

EXAMPLE 11

To a 500 mL flask, 20 g of NaH is added. The reaction system is vacuumed and refilled with argon. This process is repeated for three times. Under the argon atmosphere, 250 mL of ethylene glycol dimethyl ether, 3.4 g (0.018 mol) of

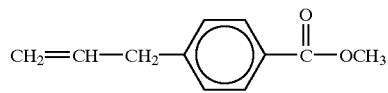

and 6.0 g (0.036 mol) of

are injected into the reaction flask. The reaction mixture is stirred at 85° C. for 5 hours, and further stirred at room temperature for 20 hours. After the reaction is completed, 5 mL of water is added. The pH of the mixture is adjusted with diluted hydrochloric acid to 5–6, then the solution is filtered. The filtrate is vacuum-distilled to remove the solvents. To the residual 100 mL of dichloromethane is added. This solution is washed with distilled water until neutral. Then after the solvents is distilled off under reduced pressure to give 5.2 g of brown product. This product is recrystallized in a mixed solvent of hexane and ethyl acetate (volume ratio 4:1) and finally 3.6 g of

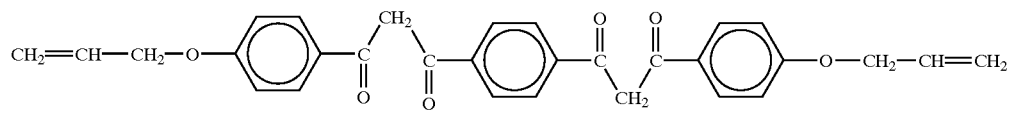

in the form of yellow needle crystal is obtained.

Except using the above β-diketone and 3-iodopropylhydrodimethoxylsilane instead of the diallyl p-phthalate (CH$_2$=CH—CH$_2$OCOC$_6$H$_4$COO—CH$_2$—CH=CH$_2$) and I(C$_6$H$_4$)$_3$Si(H)Cl$_2$, respectively, the above product is hydrosilylated and hydrolyzed in the same manner as in Example 1 to give out the organosilicon monomer

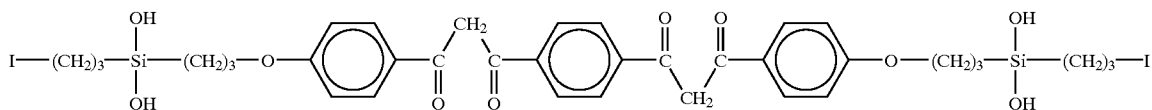

This monomer is condensed using the mixed solvent of toluene and acetone. Then the condensed product is end-blocked and purified. Finally, a brown and transparent solution of ladderlike polylsiloxane with the following structure as ladder rung

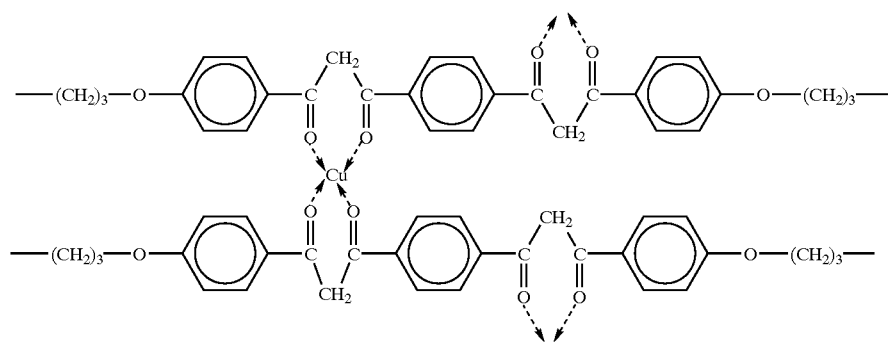

is obtained. The concentration of the polysiloxane is 28 mg/mL. Yield is 53%. Molecular weight (determined by GPC) of the polylsiloxane is $2.3 \times 10^4$ and the regularity (measured by $^{29}$Si-NMR) is 85%.

EXAMPLE 12

The apparatus and reaction procedure in Example 12 is the same as those in Example 2, but organo-bridged ladder-like polysiloxane as set forth in Example 11 is used instead of organo-bridged ladderlike polysiloxane as set forth in Example 2, and simultaneously Mg powers is used instead of Cu powers. White solid product is obtained, which can re-dissolve in THF. In IR and $^1$H-NMR spectra, the Si—H peak and Vinyl-Si peak almost disappear, indicating the completeness of the reaction.

EXAMPLE 13

1 g of dried solid tube-like organosilicon polymers which has been synthesized in Example 12 is dissolved in 20 mL of acetonitrile. Then 4 mg of $Eu(NO_3)_3.6H_2O$ is added. The mixture is heated at 50~60° C. for 24 hours. Upon cooling down, 2 mL of the reaction solution is taken and tested by fluorophotometer. It is found that the fluorescence of the $Eu^{3+}$ ions disappeares, indicating that $Eu^{3+}$ is entrapped inside tube-like polymers to form 0.76 g of white supermolecular complexes. Yield is 73%.

EXAMPLE 14

The two organosilicon monomers (I) and (II) are prepared in the same manner as in Example 5.

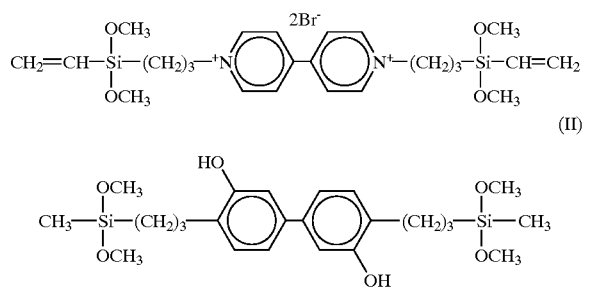

The two monomers are hydrolyzed simultaneously, then condensed and copolymerized in the same manner as in Example 5 except using $N(CH_3)_4OH$ instead of sulfuric acid as catalyst. The molar ratio of $N(CH_3)_4OH$ to the monomer (II) is $10^{-4}$–$10^{-3}$. The condensed product is end-capped and purified. Finally, a brown solution of ladderlike polysiloxane with the following structure as ladder rung

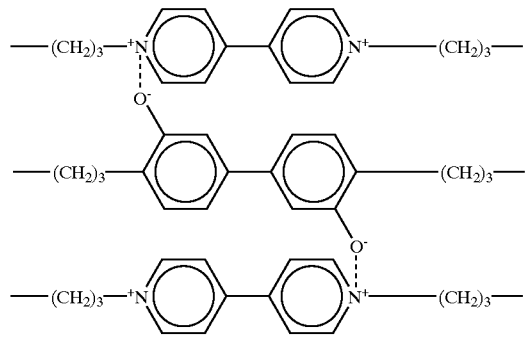

is obtained in the yield of 45%. The solution concentration of the polysiloxane is 21 mg/mL. Molecular weight (determined by GPC) of the polylsiloxane is $1.3 \times 10^4$ and the regularity (measured by $^{29}$Si-NMR) is 78%.

EXAMPLE 15

The apparatus and reaction procedure in Example 15 is the same as those in Example 5, except using $HSi(OC_2H_5)_3$ instead of $CH_2$=$CHSi(OCH_3)_3$. Thus a colorless and transparent solution of organo-bridged ladderlike polyhydridosiloxane is obtained. The concentration of the polyhydridosiloxane is 35 mg/mL. Yield is 83%. Molecular weight (determined by GPC) of the polyvinylsiloxane is $5.6 \times 10^4$ and the regularity (measured by $^{29}$Si-NMR) is 92%.

EXAMPLE 16

To a 500 mL three-necked flask is placed a magnetic stir bar. The reaction system is vacuumized and refilled with argon. This process is repeated for three times. Under the argon atmosphere, 100 mL of THF, 1.5 g of organo-bridged ladderlike polysiloxane as set forth in Example 14, and 1.3 g of organo-bridged ladderlike polyhydridosiloxane as set forth in Example 15 are injected into the system through syringes. Then 0.5 mg of catalyst $Cp_2PtCl_2$ is added. The reaction mixture is heated at 40° C. for 48 hours. Removal of THF solvent below 40° C. under vacuum condition gives 2.1 g of white solid product, which can be re-dissolved in THF. Yield is 86%. In IR and $^1$H-NMR spectra, the Si—H peak and Vi-Si peak almost disappear, indicating the completeness of the reaction.

EXAMPLE 17

To a 500 mL of three-necked flask are placed 50 mg of trans-stilbene and a stir bar. The reaction system is vacuumized and refilled with argon. This process is repeated for three times. Under the argon atmosphere, 60 mL of THF is injected into the system through a syringe. Then 1 mL of a solution of organo-bridged ladderlike polyvinylsiloxane as set forth in Example 14 in THF (concentration: 80 mg/mL), 1 mg of $Cp_2PtCl_2$, and 1 mL of organo-bridged ladderlike polyhydridosiloxane as set forth in Example 16 in THF (concentration: 107 mg/mL) are slowly added to the reaction system successively. After the addition of the above mixture, the reaction is carried out at 40~50° C. for 36~48 hours. After removal of the solvent, the product is washed with methanol several times and dried to give the final 154 mg of the white solid product. Yield is 75%. In IR and $^1$H-NMR spectra of the product there are benzene and carbon-carbon double bond peaks. It is found that the fluorescence does not disappeare when the product is irradiated by UV light and then tested with a fluorophotometer. All these results indicate that trans-stilbene is entrapped inside the tube-like polymers to form supermolecular complexes.

EXAMPLE 18

1 g of dried solid tube-like organosilicon polymer which has been synthesized in Example 16 is dissolved in 20 mL of THF. Then 50 mg of Schiff base type liquid crystal molecule (BBDA) liquid crystal molecules is added. The mixture is ultrosonicated for two hours at room temperature and then heated for 10~20 hours. Upon cooling, the methanol is added to precipitate the product. The product is washed with methanol several times and dried under vacuum to give 0.87 g of light yellow solid. Yield is 82%. On DSC measurement the melting point of BBDA disappears. In $^1$H-NMR spectrum there are peaks of benzene ring, and these peaks are broadened. All these indicate that BBDA is entrapped inside tube-like polymers to form supermolecular complexes.

EXAMPLE 19

To a 500 mL three-necked flask is placed a magnetic stir bar. The reaction system is vacuumized and refilled with argon. This process is repeated for three times. Under the argon atmosphere, 100 mL of THF, 2.2 g of organo-bridged ladderlike polyvinylsiloxane which has been synthesized as set forth in Example 14, and 0.52 g of 1,1,3,3-tetramethyldisiloxane (HMM, concentration: 1 mL of HMM/25 mL of THF) coupling reagent are injected into the system through syringes. Then 0.5 mg of catalyst $Cp_2PtCl_2$ is added. The reaction is allowed to proceed at 40° C. for 48 hours. Removal of THF solvent below 40° C. under vacuum condition gives 2.6 g of white solid product, which can be re-dissolved in THF. Yield is 93%. In IR and $^1$H-NMR spectra, the Si—H peak and Vi-Si peak almost disappear, indicating the completeness of the reaction.

EXAMPLE 20

To a 100 mL of three-necked flask are placed 50 mg of BBDA and a stir bar. The reaction system is vacuumized and refilled with argon. This process is repeated for three times. Under the argon atmosphere, 60 mL of THF is injected into the system through a syringe. Then 10 mL of a solution of organo-bridged ladderlike polysiloxane which has been synthesized in Example 14 in THF (concentration: 100 mg/mL), 1 mg of $Cp_2PtCl_2$, and 0.6 g of $HSi(CH_3)_2C_6H_4OC_6H_4(CH_3)_2SiH$ are added to the reaction system successively. After the addition of the above mixture, the reaction is carried out at 40~50° C. for 36~48 hours. After removal of the solvents, the product is washed with methanol several times and dried to give 0.53 g of the final white solid product. Yield is 86%. The IR spectrum of the product indicates the completeness of the reaction. The melting point peak of BBDA disappeares in the DSC curve. In $^1$H-NMR spectrum there are peaks of benzene ring, and these peaks are broadened. All these indicate that BBDA molecules are entrapped inside tube-like polymers.

EXAMPLE 21

A mixture of 18.6 g of 3,5'-bis(hydroxy)-dibenzene,

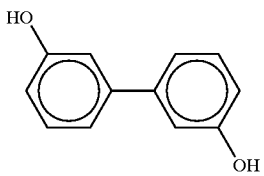

100 mL of acetone, 24.2 g of allyl bromide, and 28 g of potassium carbonate is refluxed for 24 hours, water is added to dissolve the inorganic salt, and the reaction product is extracted with diethylether. The unreacted starting materials are removed by extraction with 1 N sodium hyoxide and the solution is washed well with water, dried and evaporated to give 17.5 g of orange-yellow residue. Then the residue is dissolved in 300 mL of kerosene (b.p. 200–220° C.). This solution is refluxed vigorously under the argon atmosphere for more than 5 hours. Then after removing most of the kerosene by vacuum distillation, a large amount of deposits is obtained. The deposits are washed with petroleum ether to remove residual kerosene and dried at 50° C. under vacuum conditions. The deposits are heated to boiling with 1 L of water containing a little sodium hydrosulfite for 30 minuets. Then the hot solution is decanted and filtered. On cooling the colorless filtrate 4.8 g of 4,4'-bis(alloy)-3,5'-bis(hydroxy)-dibenzene

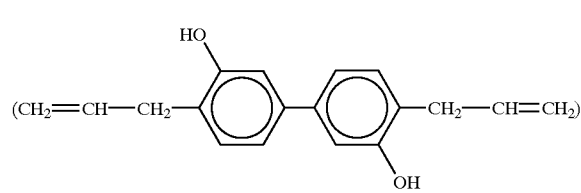

in the form of flat needles is obtained. Yield is 18.0%.

The following hydrosilylation reaction is conducted in the same manner as in Example 1 excepting using 4,4'-bis(alkoxy)-3,5'-bis(hydroxy)-dibenzene and $HOC_6H_4Si(H)Cl_2$ instead of the diallyl p-phthalate ($CH_2=CH—CH_2NHCOC_6H_4CONH—CH_2—CH=CH_2$) and $I(C_6H_4)_3Si(H)Cl_2$, respectively, and finally a colorless and transparent go solution of ladderlike polysiloxane with

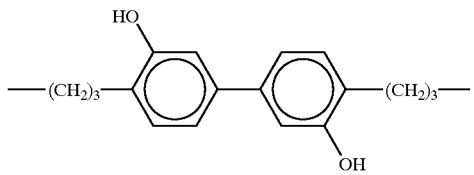

as bridge and $HOC_6H_4$— as side groups is obtained. The concentration of the polysiloxane is 45 mg/mL. Yield is 73%. Molecular weight (determined by GPC) is $1.2 \times 10^4$. Regularity (measured by $^{29}$Si-NMR) is 94%.

EXAMPLE 22

The apparatus and reaction procedure in Example 22 is the same as those in Example 21, but $Cl^-N_2^+C_6H_4Si(H)Cl_2$ is used instead of $HOC_6H_4Si(H)Cl$. White solid product is obtained, which can re-dissolve in THF. The concentration of the polysiloxane is 52 mg/mL. Yield is 81%. Molecular weight (determined by GPC) is $2.6 \times 10^4$. Regularity (measured by $^{29}$Si-NMR) is 90%.

EXAMPLE 23

12.1 g of organo-bridged ladderlike polysiloxane synthesized in Example 21 and 15.3 g of organo-bridged ladderlike polysiloxane synthesized in Example 22 (molar ratio 1:1) is dissolved in 300 mL of mixture of water and alcohol solvents (volume ratio=1:1). The above solution is added to a 3 L of three-necked flask. Then 100 g of ice and 150 g of $Na_2CO_3$ are added to the flask. The reaction temperature is controlled between 0~−5° C. via ice-water. After the reaction, the solution is extracted by diethyl ether. The ether solution is dried over anhydrous $Na_2SO_4$. After removal of solvent in the above dried solution under vacuum condition, 10.3 g of white solid product is obtained, which can be re-dissolved in THF. Yield is 69%. In IR and $^1$H-NMR spectra, the $—C_6H_4OH$ peak and $—C_6H_4N_2^+Cl^-$ peak almost disappear, indicating the completeness of the reaction.

EXAMPLE 24

1 g of dried solid tube-like organosilicon polymers synthesized in Example 23 is dissolved in 20 mL of THF. Then 100 mg of poly(acrylic acid) is added. The mixture is ultrosonicated for two hours at room temperature and then stays overnight. Methanol is added to precipitate the product. The solution is then centrifuged. The upper layer is decanted and the precipitate is washed with methanol three times and then with water several times. The product is dried under vacuum to give 0.74 g of white solid. Yield is 67%.

In IR spectrum there is a strong peak of carbonyl group and is shifted to red for 5 cm$^{-1}$. In $^{13}$C-NMR spectrum the COOH peak is shifted about 2~3 ppm down-field. All these indicate that poly(acrylic acid) is entrapped inside tube-like polymers to form supermolecular complexes.

What is claimed is:

1. An organo-bridged ladderlike polysiloxane of the following formula:

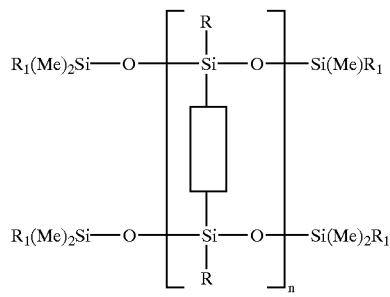

wherein, n is an integer from 10 to 10$^5$; R is a reactive group selected from the group consisting of hydrogen, halogen-containing group, alkenyl, substituted alkenyl, alkynyl, substituted alkynyl, aryl, substituted aryl, $—C_6H_4OH$, $—C_6H_4NH_2$, $—C_6H_4N_2^+Cl^-$ and $—C_6H_4—C_6H_4N_2^+Cl^-$; $R_1$ is selected from the group consisting of a hydrogen-bonding producing group, a charge-transfer complex producing group, a metal ion-ligand complexes producing group, and an electrostatic interaction group;

is an organo-bridged group presented by the following formula:

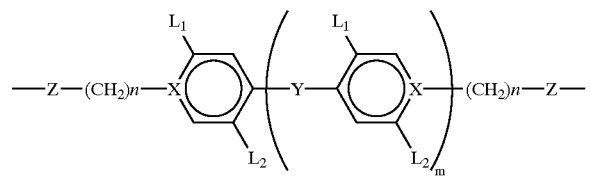

wherein

X is a carbon or a nitrogen atom, and when X is a nitrogen atom, Y is absent, Z is also absent, each of $L_1$ and $L_2$ is a hydrogen atom, m is 1, n is 1,2,3,4, or 5;

when X is a carbon atom, Y is absent or is selected from the group consisting of —CONH—, —COCH$_2$CO—, and —COO—, Z is absent or is selected from the group consisting of —O—, —NH—, —CONH—, —COCH$_2$CO—, and —COO—, $L_1$ and $L_2$ may be same or different and is selected from the group consisting of —H, —OH, —NH$_2$, and —CONH$_2$; m is 0, 1, or 2; n is 0, 1, 2, 3, 4 or 5.

2. An organo-bridged ladderlike polysiloxane of claim 1, wherein $R_1$ is selected from the group consisting of hydroxy, nitro, amino, amide, quaternary ammonium cation, phenolic and carboxylic anions.

3. An organo-bridged ladderlike polysiloxane of claim 1, wherein the organo-bridged group or organo-bridged groups are one of the following:

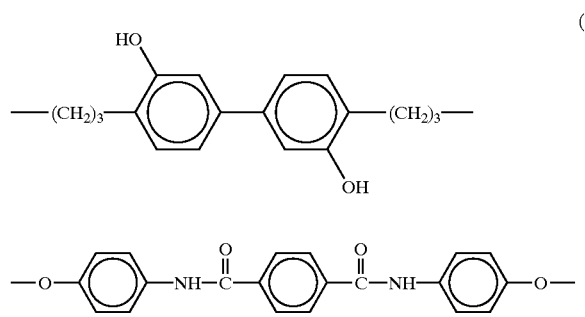

(a)

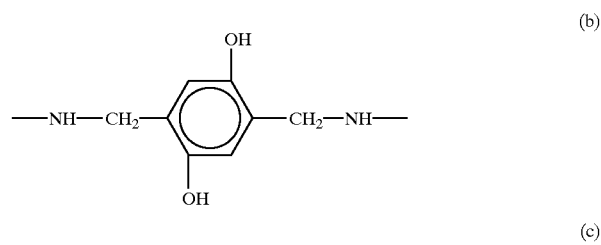

(b)

(c)

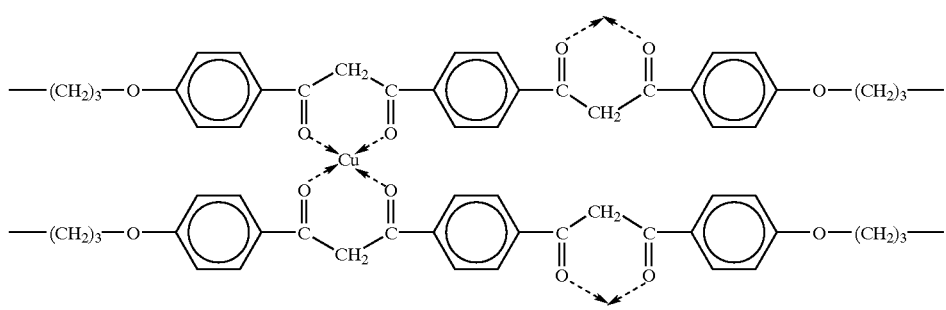
(d)

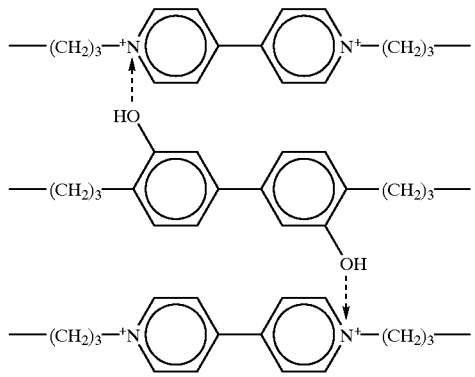
(e)

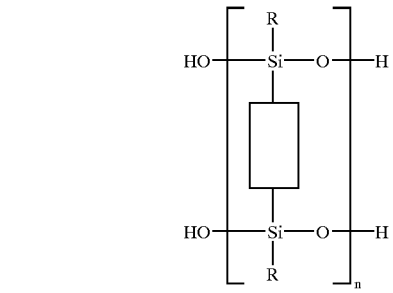
(f)

4. An organo-bridged ladderlike polysiloxane of claim 1, wherein the organo-bridged ladderlike polysiloxane possess a cis-isotactic configuration and mono-dispersed number-averaged molecular weight distribution, wherein the number-averaged molecular weight is in the range of $10^3$–$10^6$.

5. A method for preparing the organo-bridged ladderlike polysiloxane of claim 1, comprising the steps of:

(1) synthesizing an organo-bridged organosilicon monomer, by a coupling reaction of trihalogensilane or trialkoxysilane with α,ω-difunctional coupling agent, the monomer being represented by

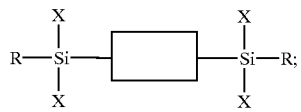

(2) hydrolysing the above-mentioned organo-bridged organosilicon monomer to obtain an intermediate compound represented by

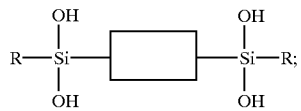

(3) polycondensing the above-mentioned hydrolysis product to obtain an organo-bridged ladderlike polysioxane represented by

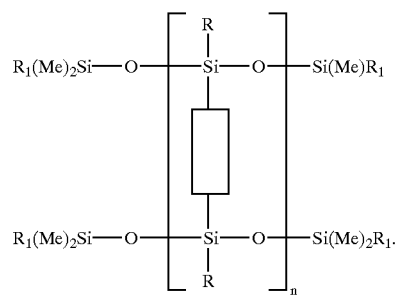

(4) end-capping the above-mentioned organo-bridged ladderlike polysiloxane with a functional organosilicone compound to obtain the end-capped organo-bridged ladderlike polysiloxane represented by (5) carrying out fractional precipitation to obtain a monodispersed organo-bridged ladderlike polysiloxane wherein, X is halogen atom or alkoxy group; R is a reactive group selected from the group consisting of hydrogen, halogen-containing group, alkenyl, substituted alkenyl, alkynyl, substituted alkynyl, aryl, substituted aryl, —$C_6H_4OH$, —$C_6H_4NH_2$, —$C_6H_4N_2^+Cl^-$ and —$C_6H_4$—$C_6H_4N_2^+C^-$; n is an integer from 10 to $10^5$.

6. A tube-like organosilicon polymer represented by the following formula:

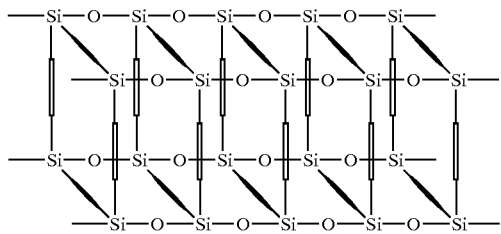

wherein,

● is a bridge group selected from the group consisting of —$(CH_2)_3SiOSi(CH_2)_3$—, —$C_6H_4N=NC_6H_4$—, and —$(CH_2)_mSi(CH_3)_2C_6H_4OC_6H_4(CH_3)_2Si(CH_2)_m$—, wherein m is 2 or 3;

is an organo-bridged group presented by the following formula:

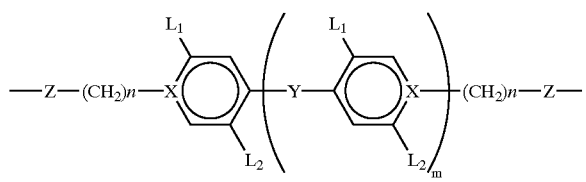

wherein
X is a carbon or a nitrogen atom, and
when X is a nitrogen atom, Y is absent, Z is also absent, each of $L_1$ and $L_2$ is a hydrogen atom, m is 1; n is 1,2,3,4, or 5;
when X is a carbon atom, Y is absent or is selected from the group consisting of —CONH—, —$COCH_2CO$—, and —COO—, Z is absent or is selected from the group consisting of —O—, —NH—, —CONH—, —$COCH_2CO$—, and —COO—, $L_1$ and $L_2$ may be same or different and is selected from the group consisting of —H, —OH, —$NH_2$, and —$CONH_2$; m is 0, 1, or 2; n is 0, 1, 2, 3, 4 or 5.

7. A method for preparing a tube-like organosilicon polymer, comprising a step of carrying out intra-macromolecular cyclization by using the organo-bridged ladderlike polysiloxane of claim 1 as starting material.

8. A tube-like organosilicon polymeric complex represented by the following formula:

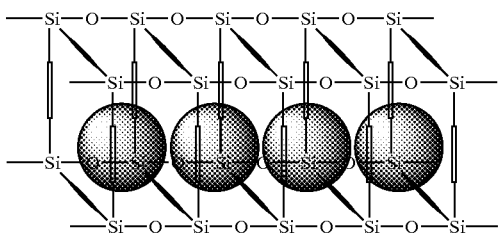

wherein
⊛ is a metal ion, a low molar mass guest molecule, or a polymer molecule entrapped inside the tube;
● is a bridge group selected from the group consisting of —$(CH_2)_3SiOSi(CH_2)_3$—, —$C_6H_4N=NC_6H_4$—, and —$(CH_2)_mSi(CH_3)_2C_6H_4OC_6H_4(CH_3)_2Si(CH_2)_m$—, wherein m is 2 or 3;

is an organo-bridged group presented by the following formula:

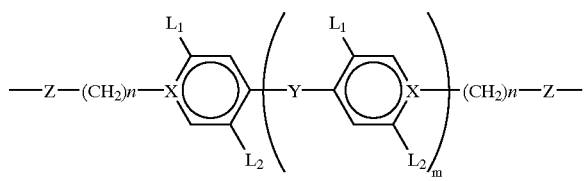

wherein
X is a carbon or a nitrogen atom, and
when X is a nitrogen atom, Y is absent, Z is also absent, each of $L_1$ and $L_2$ is a hydrogen atom, m is 1; n is 1, 2, 3, 4, or 5;
when X is a carbon atom, Y is absent or is selected from the group consisting of —CONH—, —$COCH_2CO$—, and —COO—; Z is absent or is selected from the group consisting of —O—, —NH—, —CONH—, —$COCH_2CO$—, —COO—, $L_1$ and $L_2$ may be same or different and is selected from the group consisting of —H, —OH, —$NH_2$, and —$CONH_2$; m is 0, 1, or 2; n is 0, 1, 2, 3, 4 or 5.

9. A tube-like organosilicon polymeric complex of claim 8, wherein the low molar mass molecule is selected from the group consisting of cyclohexanone, tetrahydrofuran (THF), N-(4-nitrophenyl)-2-proline (NPP), azobenzene or its derivatives, fullerene, Schiff bases, trans-stilbene, $C_{60}$ molecule and their derivatives.

10. A tube-like organosilicon polymeric complex of claim 8, wherein the metal ion is an alkaline metal ion or a transition metal ion.

11. A tube-like organosilicon polymeric complex of claim 8, wherein the polymer molecule is selected from the group consisting of poly(ethylene glycol), poly(vinyl alcohol), poly(acyl imide) or its derivatives, poly(acrylic acid) or its derivatives, polyamide, polyester, polyolefin and polyalkyne.

* * * * *